(12) United States Patent
Teittinen et al.

(10) Patent No.: US 9,787,484 B2
(45) Date of Patent: Oct. 10, 2017

(54) ADAPTING PCC RULES TO USER EXPERIENCE

(71) Applicant: NOKIA SOLUTIONS AND NETWORKS OY, Espoo (FI)

(72) Inventors: Veli-Matti Teittinen, Nummela (FI); Seppo Olavi Hamalainen, Espoo (FI); Jukka Kalevi Jokinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/768,803

(22) PCT Filed: Feb. 20, 2013

(86) PCT No.: PCT/EP2013/053333
§ 371 (c)(1),
(2) Date: Aug. 19, 2015

(87) PCT Pub. No.: WO2014/127812
PCT Pub. Date: Aug. 28, 2014

(65) Prior Publication Data
US 2016/0006571 A1   Jan. 7, 2016

(51) Int. Cl.
H04W 4/24      (2009.01)
H04L 12/14     (2006.01)
H04L 12/24     (2006.01)
H04M 15/00     (2006.01)

(52) U.S. Cl.
CPC ...... *H04L 12/1407* (2013.01); *H04L 41/0893* (2013.01); *H04L 41/5025* (2013.01); *H04L 41/5067* (2013.01); *H04M 15/58* (2013.01); *H04M 15/66* (2013.01); *H04L 41/5064* (2013.01)

(58) Field of Classification Search
None
See application file for complete search history.

(56) References Cited

U.S. PATENT DOCUMENTS

| | | |
|---|---|---|
| 2011/0320622 A1 | 12/2011 | Cutler et al. |
| 2012/0140624 A1 | 6/2012 | Denman et al. |
| 2013/0114460 A1* | 5/2013 | Rubio Vidales .... H04L 12/1407 370/252 |

(Continued)

FOREIGN PATENT DOCUMENTS

EP      2 398 262 A1    12/2011

OTHER PUBLICATIONS

International Search Report and Written Opinion dated Oct. 10, 2013 corresponding to International Patent Application No. PCT/EP2013/053333.

(Continued)

*Primary Examiner* — Daniel Lai
*Assistant Examiner* — Frank Donado
(74) *Attorney, Agent, or Firm* — Squire Patton Boggs (US) LLP

(57) ABSTRACT

A method for policy management in a network comprises collecting data relating to one or more active user equipment in the network, processing said data, and responsive to said processing determining if policy management provided by a policy function of the network with respect to a respective user equipment is to be changed.

16 Claims, 4 Drawing Sheets

(56) References Cited

U.S. PATENT DOCUMENTS

2014/0293824 A1* 10/2014 Castro Castro ....... H04L 41/142
370/252
2015/0079926 A1* 3/2015 Gonzalez Plaza .... H04M 15/66
455/406

OTHER PUBLICATIONS

3GPP TS 23.203 V11.7.0 (Sep. 2012), Technical Specification, 3rd Generation Partnership Project; Technical Specification Group Services and System Aspects; Policy and charging control architecture (Release 11), Sep. 2012, 178 pages.
3GPP TS 23.401 V11.3.0 (Sep. 2012), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 11), Sep. 2012, 283 pages.
3GPP TS 23.402 V11.4.0 (Sep. 2012), Technical Specification, 3rd Generation Partnership Project; Technical Specification Group Services and System Aspects; Architecture enhancements for non-3GPP accesses (Release 11), Sep. 2012, 252 pages.
3GPP TS 29.212 V11.6.0 (Sep. 2012), Technical Specification, 3rd Generation Partnership Project; Technical Specification Group Core Network and Terminals; Policy and Charging Control (PCC); Reference points (Release 11), Sep. 2012, 194 pages.

* cited by examiner

ADAPTING PCC RULES TO USER EXPERIENCE

The invention relates to communication networks. Embodiments of the present invention relate generally to mobile communications. Some embodiments relate to methods and apparatus and in particular but not exclusively to methods and apparatus for controlling one or more policies applicable to one or more user equipment.

A communication system can be seen as a facility that enables communications between two or more entities such as a communication device, e.g. mobile stations (MS) or user equipment (UE), and/or other network elements or nodes, e.g. Node B or base transceiver station (BTS), associated with the communication system. A communication system typically operates in accordance with a given standard or specification which sets out what the various entities associated with the communication system are permitted to do and how that should be achieved.

Wireless communication systems include various cellular or other mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS) and the universal mobile telecommunications system (UMTS).

A mobile communication network may logically be divided into a radio access network (RAN) and a core network (CN). The core network entities typically include various control entities and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN). Examples of radio access networks may comprise the UMTS terrestrial radio access network (UTRAN) and the GSM/EDGE radio access network (GERAN).

A geographical area covered by a radio access network is divided into cells defining a radio coverage provided by a transceiver network element, such as a base station or Node B. A single transceiver network element may serve a number of cells. A plurality of transceiver network elements is typically connected to a controller network element, such as a radio network controller (RNC).

A user equipment or mobile station may be provided with access to applications supported by the core network via the radio access network. In some instances a packet data protocol (PDP) context may be set up to provide traffic flows between the application layer on the user equipment and the application supported by the core network.

Policy and charging control is provided in some standards. The policy and charging control provides one or more policies which may be applied to a user equipment when using a network.

According to an aspect, there is provided a method for policy management in a network comprising: collecting data relating to one or more active user equipment in the network; processing said data; and responsive to said processing determining if policy management provided by a policy function of the network with respect to a respective user equipment is to be changed.

The method may comprise, if said policy management is to be changed, causing one or more policies to be one of activated or deactivated.

The method may comprise, if said policy management is to be changed, causing one or more parameters of one or more policies to be changed.

The method may comprise, if said policy management is to be changed, causing one or more policies which are associated with said respective user equipment to be changed.

The method may comprise, if said policy management is to be changed, causing one or more new policies to be stored in said policy function.

The data may comprise customer experience data.

The customer experience data may comprise one or more of experienced parameter compared to a requested parameter, a failure of service parameter, a handover failure parameter, latency, number of handovers, quality of service parameter, and data rate.

The method may comprise collecting one or more network performance metrics.

The said processing may comprise analysing said data.

The processing may comprise determining at least one key performance indicator.

The processing may comprise determining a current performance with respect to an expected performance.

The policy function may comprise at least one of a policy and charging rules function and a policy and charging enforcement function.

The method may comprise comparing data prior to a change in policy management and after said change in policy management to determine an effectiveness of said change.

The method may comprise using said effectiveness of said change to determine if said changed policy management is to be used when one or more similar conditions are present.

The data may comprise at least one of historical data and real time data.

According to another embodiment, there is provided an apparatus which is configured to perform the previous method (s).

A computer program comprising program code means adapted to perform the method(s) may also be provided. The computer program may be stored and/or otherwise embodied by means of a carrier medium.

According to another embodiment, there is provided an apparatus for policy management in a network comprising at least one processor and at least one memory including computer code for one or more programs, the at least one memory and the computer code configured, with the at least one processor, to cause the apparatus at least to: collect data relating to one or more active user equipment in the network; process said data; and responsive to said processing determine if policy management provided by a policy function of the network with respect to a respective user equipment is to be changed.

The at least one memory and the computer program code may be configured to, with the at least one processor, cause the apparatus, if said policy management is to be changed, cause one or more policies to be one of activated or deactivated.

The at least one memory and the computer program code may be configured to, with the at least one processor, if said policy management is to be changed, cause one or more parameters of one or more policies to be changed.

The at least one memory and the computer program code may be configured to, with the at least one processor, if said policy management is to be changed, cause one or more policies which are associated with said respective user equipment to be changed.

The at least one memory and the computer program code may be configured to, with the at least one processor, if said policy management is to be changed, cause one or more new policies to be stored in said policy function.

The data may comprise customer experience data.

The customer experience data may comprise one or more of experienced parameter compared to a requested parameter, a failure of service parameter, a handover failure parameter, latency, number of handovers, quality of service parameter, and data rate.

The at least one memory and the computer program code may be configured to, with the at least one processor collect one or more network performance metrics.

The at least one memory and the computer program code may be configured to, with the at least one processor analyse said data.

The at least one memory and the computer program code may be configured to, with the at least one processor determine at least one key performance indicator.

The at least one memory and the computer program code may be configured to, with the at least one processor determine a current performance with respect to an expected performance.

The policy function may comprise at least one of a policy and charging rules function and a policy and charging enforcement function.

The at least one memory and the computer program code may be configured to, with the at least one processor compare data prior to a change in policy management and after said change in policy management to determine an effectiveness of said change.

The at least one memory and the computer program code may be configured to, with the at least one processor to use said effectiveness of said change to determine if said changed policy management is to be used when one or more similar conditions are present.

The data may comprise at least one of historical data and real time data.

According to another aspect, there is provided an apparatus for policy management in a network comprising: means for collecting data relating to one or more active user equipment in the network; means for processing said data; and responsive to said processing means for determining if policy management provided by a policy function of the network with respect to a respective user equipment is to be changed.

The determining means may, if said policy management is to be changed, cause one or more policies to be one of activated or deactivated.

The determining means may, if said policy management is to be changed, cause one or more parameters of one or more policies to be changed.

The determining means may, if said policy management is to be changed, cause one or more policies which are associated with said respective user equipment to be changed.

The determining means may, if said policy management is to be changed, cause one or more new policies to be stored in said policy function.

The data may comprise customer experience data.

The customer experience data may comprise one or more of experienced parameter compared to a requested parameter, a failure of service parameter, a handover failure parameter, latency, number of handovers, quality of service parameter, and data rate.

The collection means may be for collecting one or more network performance metrics.

The processing means may be for analysing said data.

The processing means may be for determining at least one key performance indicator.

The processing may be for determining a current performance with respect to an expected performance.

The policy function may comprise at least one of a policy and charging rules function and a policy and charging enforcement function.

The determining means may be for comparing data prior to a change in policy management and after said change in policy management to determine an effectiveness of said change.

The determining means may be for using said effectiveness of said change to determine if said changed policy management is to be used when one or more similar conditions are present.

The data may comprise at least one of historical data and real time data.

In the above, many different embodiments have been described. It should be appreciated that further embodiments may be provided by the combination of any two or more of the embodiments described above.

Embodiments are described below, by way of example only, with reference to the accompanying drawings, in which.

PCC (policy and charging control) is provided in the 3GPP standard. The policy and charging control may have a flow-based charging function and a policy control function. The flow-based charging function may provide a charging and/or online credit control function. The policy control function may comprise one or more of a gating control function, a quality of service control function, a quality of service signalling function and/or the like. The policy and charging control function has been proposed for the evolved 3GPP packet switched domain and may support both 3GPP accesses and non-3GPP accesses. By way of example only, the 3GPP accesses may comprise GERAN ((GSM/edge radio access network), UTRAN (UMTS terrestrial radio access network) and E-UTRAN evolved UTRAN) accesses. Other accesses may alternatively or additionally be supported.

Figure 1:
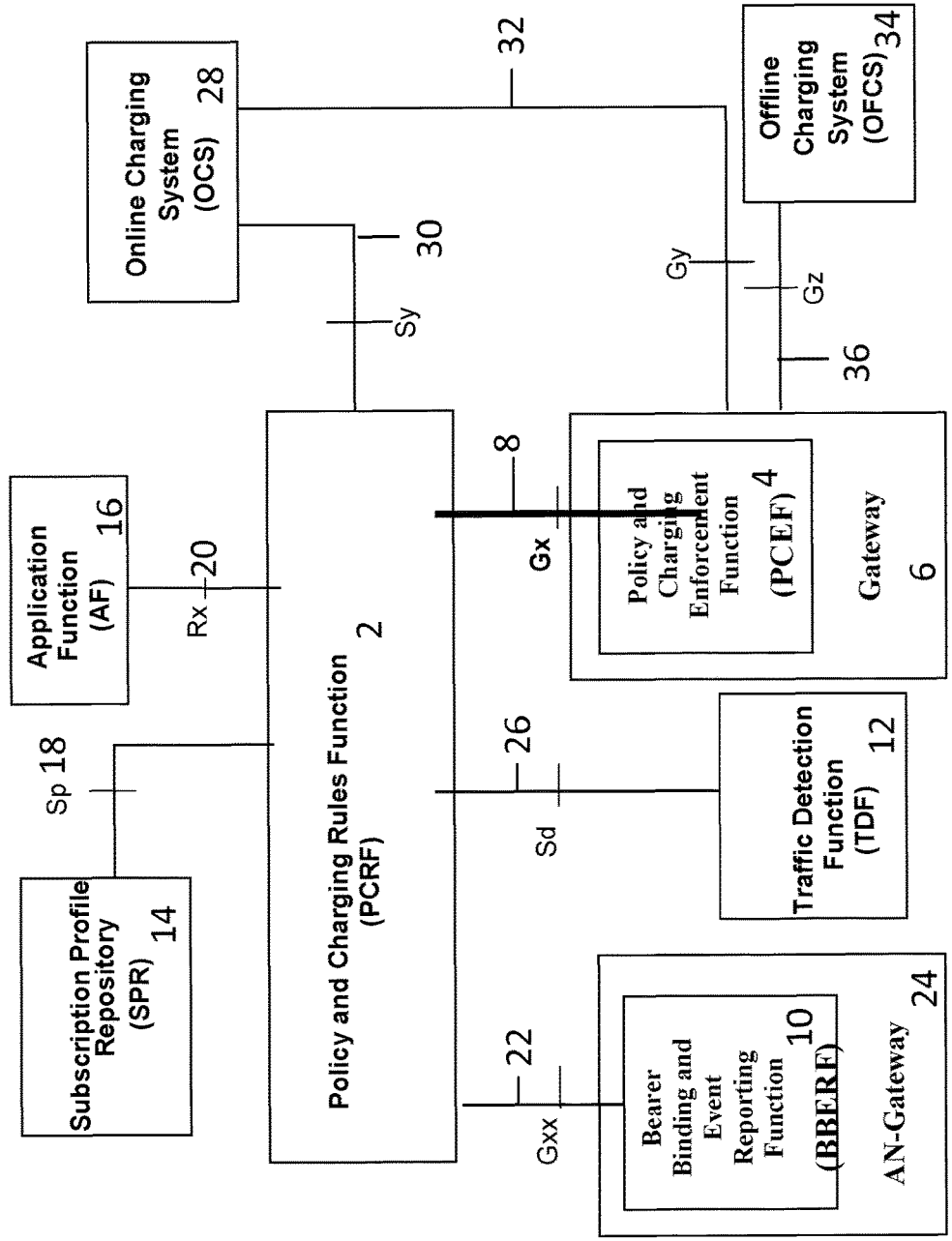
FIG. 1 shows a current PCC architecture.

Reference is made to FIG. 1 which schematically shows part of the system providing a PCC function.

The PCC architecture has two main components. The first is the PCRF (policy and charging rules function) 2. The second main component is the PCEF (policy and charging enforcement function) 4. The PCRF may be provided in a PCS (Policy Control Server). The PCS may be a standalone server or may be provided as part of another server or function. The PCRF may have a policy repository containing policies and rules. The PCRF may inform the PCEF through the use of PCC rules on the treatment of each service data flow that is under PCC control, in accordance with the PCRF policy decisions.

The PCEF 4 may be implemented in a Gateway 6 and enforce the policy rules according to PCRF orders.

In use, once a session is to be established or the session is on-going and a predefined event is triggered, the PCEF 4 will contact the PCRF 2 to request further instructions. The PCRF may request the PCEF to trigger an event based on one or more criteria. For example the PCEF may monitor or track the data volume, quota and/or the like of the service and when a limit is reached, the PCEF would inform PCRF. A trigger may alternatively or additionally be also for example the change of RAT (Radio access technology). These may defined in a Gx interface.

If there is a policy and a predefined condition is fulfilled, the PCRF may adjust one or more session parameters and/or provide new rules to be executed in the PCRF.

There may be two different types of the PCC rules. In particular, there may be dynamic PCC rules and/or predefined PCC rules. Dynamic PCC rules may be dynamically provided by the PCRF to the PCEF by a suitable interface 8. In some embodiments, that interface may be a Gx interface. These PCC rules may be predefined and/or dynamically generated in the PCRF. The dynamic PCC rules may be installed, modified and/or removed at any time.

The predefined PCC rules may be preconfigured in the PCEF. The predefined PCC rules can be activated or deactivated by the PCRF at any time. The predefined PCC rules within the PCEF may be grouped allowing the PCRF to dynamically activate a set of PCC rules over the Gx interface.

A PCC rule may comprise one or more of the following: rule name, service identifier, one or more service data flow filters, precedence, gate status, quality of service parameter or parameters, indication for packet switched to circuit switched session continuity, charging key, for example rating group, any other suitable charging parameter or parameters, monitoring key, sponsor identity, application service provider identity, and indication of access network information reporting.

In some embodiments, it may be possible to take a PCC rule into service and out of service at, for example, specific times of day, without any PCC interaction at that point in time. The PCRF may accept input for PCC decision-making from one or more of the PCEF, a bearing binding and event reporting function BBERF 10 (if present), a traffic detection function TDF 12 (if present), a subscriber profile register SPR 14 and, if an application function AF is involved from the application function 16. Additionally or alternatively, the PCRF may use its own predefined information. One or more of these different functions may provide as much information as possible to the PCRF. In some embodiments, the BBERF existence may depend on BBF (Bearer Binding Function) location which may be dependent on technology. The BBF may be located in the PCEF (PDN-GW) or BBERF which then would be in S-GW. The BBERF would implement Bearer Binding related control according PCC rules and may provide event reporting capability It should be appreciated that the SPR 14 is coupled to the PCRF 2 via the Sp interface 18. The application function 16 is coupled to the PCRF 2 via the Rx interface 20. The BBERF 10 is coupled to the PCRF 2 via the Gxx interface 22. It should be appreciated that the BBERF 10 may be part of an AN (access network) Gateway 24. The PCRF 2 is coupled to the TDF 12 via the Sd interface 26.

Also shown in FIG. 1 is an on line charging system OCS 28 which is coupled to the PCRF 2 via a Sy interface 30. The on-line charging system 28 is coupled to the PCEF 4 via a Gy interface 32.

Finally, an off-line charging system OFCS 34 is provided which is coupled to the PCEF 4 via the Gz interface 36.

Currently, network monitoring and/or customer data collection from the network are typically vendor specific solutions. Thus typically building business intelligent data collection, warehouse, analytics and or/intelligence on the top of the networks are proprietary implementations.

Currently, it is possible to take a PCC rule into service and out of service at specific times of day without any PCC interaction at that point in time. Currently, the interfaces and interaction between PCRF and PCEF and the other entities are defined in the 3GPP standard. However, the PCC architecture does not define how the PCRF should manage its policy and rules. In other words, there is no discussion about how the rules should be defined, when to apply the rules and how to define the relationship between the subscriber and policy. Currently, the policy rule may be taken into service or out of service according to certain conditions. Those conditions are based on known facts and are predefined. For example, PCC rules are defined so that it known or understood that if one thing occurs, a responsive action may occur. For example, if the subscriber exceeded a quota, the QoS parameters may be decrease which could mean for example low data volumes. If subscriber is using some specific application/protocol not allowed by operator, then the use of it may be denied. The input data is then compared to the policy/rule conditions. However, the current system does not address the fact the conditions may change over time. For example, a user experiences good enough throughput compared to the requested throughput. Then suddenly the user starts to get poor throughput for example because the subscriber moved to some other location, is using different one or more applications, the network is congested in some location and/or the like. There are lot of different reasons that may impact directly or indirectly to user experience and the rules that were set were based on one or more assumptions are not valid/useful any more.

For example, with the current system, the policy may be specified when observing an issue based on statistical information. The policy may then apply the necessary correction by defining the policy in a policy repository. Thus, in use, when a user equipment establishes a connection and a policy rule condition is fulfilled, policy rules are then used.

It has been proposed that policies should be predefined in the policy repository. The policies may be created or managed by a separate policy manager application and deployed to a PCC server or PCS. Using policy conditions, it is possible to define exceptions for normal behaviour in specific network conditions. For example, when a particular network condition or conditions occur, then a particular policy or policy rule may be used. The conditions can be any suitable condition and by way of example may be one or more of time, location, traffic volume, radio access technology and any other suitable condition.

Figure 2:
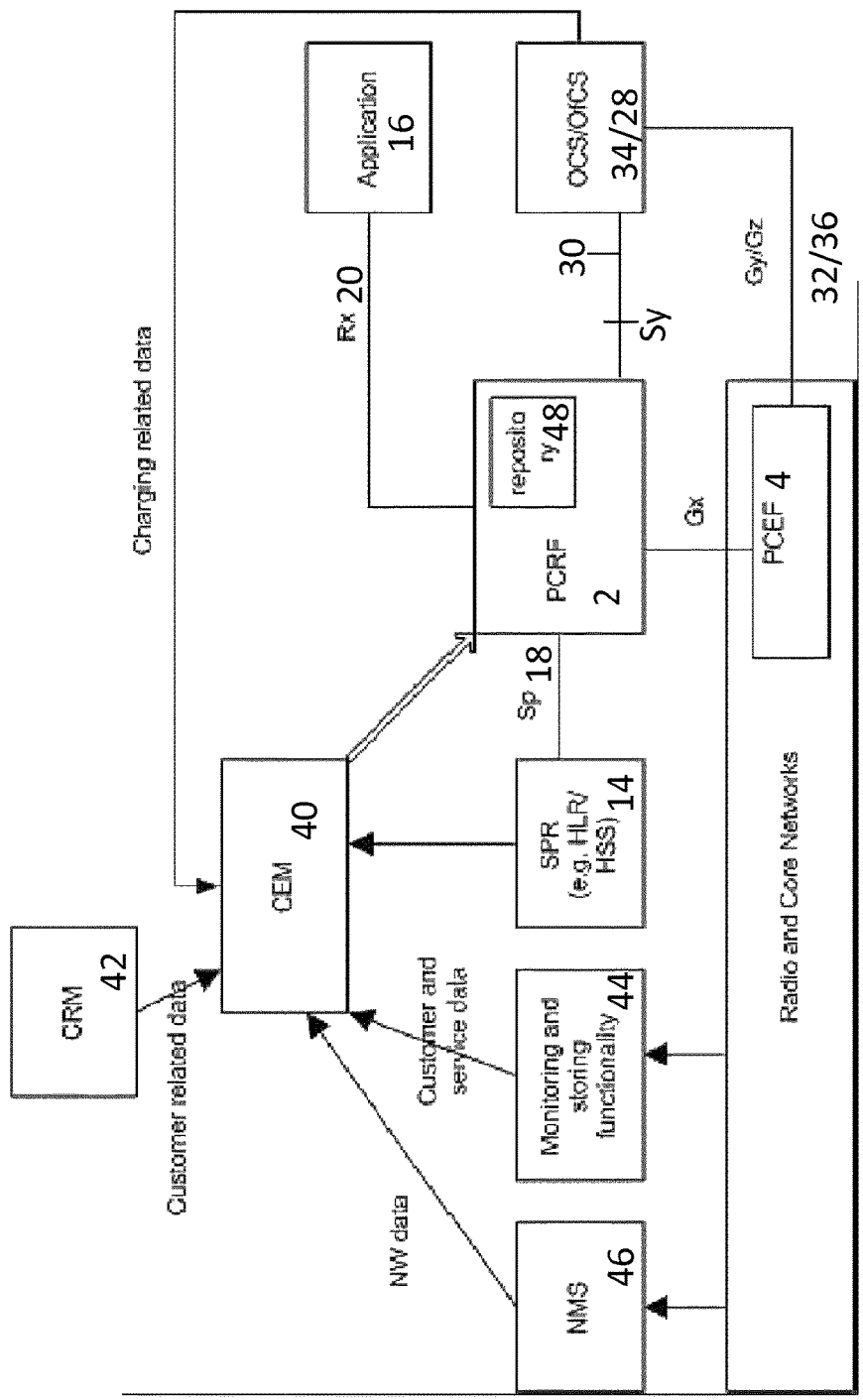
FIG. 2 shows an embodiment with a customer experience module.

Reference is made to FIG. 2 which shows a system of an embodiment. In this embodiment, those functions which of the same as the functions shown in FIG. 1 or equivalent thereto, are marked with the same reference number.

In some embodiments, a module 40 is provided which provides a subscriber data function. This module for convenience will be referred to as a customer experience management CEM module 40 in this disclosure. The CEM 40 collects customer specific data from the radio and/or core network. The collection of the data may be periodically or on demand or some combination of the two.

The CEM 40 may calculate and/or analyse one or more KPI's (key performance indicators) against customer subscription and/or operator policies.

Based on the data which the CEM has, collected and/or determined, the CEM may order the PCRF to enable/disable policies.

Alternatively or additionally, the CEM may change one or more parameters of those policies.

Alternatively or additionally the CEM 40 may alter the list of subscribers to which the policy is applied.

The CEM 40 may use customer or subscriber specific data in order to manage the policies.

Alternatively or additionally, one or more network performance metrics may be used for controlling the customer or subscriber specific policies. These may be one or more of network performance measurements, KPIs collected from the network management system or OSS or counters.

The network performance metrics may comprise one or more of load, traffic policies or the like.

In some embodiments, to improve policy rule decision making accuracy, the selection may be made taking into account the results of a previous action or actions. The CEM may measure customer experience or some other suitable parameter for subscribers and in certain conditions or circumstances, a change of policy rule sets set or sets may be triggered. Customer experience (or QoE quality of experience) may be defined in any suitable manner. This may be use case specific and the one or more parameters measured to define customer experience may be dependent on the use case. The one or more parameters may be experienced throughput/bit rate during a period compared to a requested one, number of failures in service, HO (handover) failures, number of HOs, latency, or the like. The impact of the selected policy rule set to customer experience may then be measured and the system will learn which policy rule sets provide best performance in certain conditions.

Referring to FIG. 2, it can be seen that the CEM 40 is configured to receive customer related data from for example a customer relationship management CRM module 42. The CEM 40 is configured to receive charging related data from the OCS and/or the OFCS 28/34. CEM may be an element that would have customer insights from network monitoring tools and may have the algorithm for changing Policy rules. The CRM may contain generic data of a subscriber such as personal information and/or one or more of subscription details, subscriber type, offerings etc. In one example, the CRM would know if a user is gold, silver, bronze or the like class user. In some embodiments, the CEM may be a distributed entity. For example the CEM may be distributed across one or more entities such as monitoring tools, analysis tools and/or configuration tools.

The CEM 40 also receives subscription data from the SPR 14. In some embodiments, the SPR may be a HLR (home location register) and/or HSS (home subscriber server). The SPR may contain a user PCC profile but in some embodiments may contain also HSS/HLR. In some embodiments, alternatively or additionally the data may come from one or more different sources depending on the implementation. The CRM may be one possible source of data.

The CEM 40 also receives customer and service data from a monitoring and storing functionality 44. Customer and service data may be measurements from network data about customers and/or service. For example, the customer data may be one or more of when a customer used the service, what service, what application, how much data and/or the like. The service data may be from services' perspective and may be one or more of how many users used the service, how much data was carried when using this service, which RATs (radio access technologies) were used by this service etc.

The CEM may also receive network data from a network management system 46. This will be described in more detail later. Network data may be Network CM (configuration management, FM (fault management) and PM (performance management) data. This may be different from customer and service data.

With the CEM (or similar element) it is possible to analyse customer data, and characterize subscribers and their behaviour (trends, usage history etc.). Furthermore it is possible to see the changes in subscriber's behaviour and statistical data such as subscription and charging characteristics. Combining this information and capability to manage a subscriber's relationship to policy rules makes possible CE (customer experience) based policy management.

By adding/removing policy or modifying policy content it is possible to control rules in PCEF.

The PCRF has a policy repository 48. This stores policies and/or rules. The repository may be provided by any suitable storage entity and may for example be a database or the like.

In some embodiments the CEM would not directly communicate with the PCEF but would manage policies in the PCRF (PCRF repository 48). This is if the CEM is not implementing PCRF. If PCRF is implemented in CEM then direct communication with the PCEF is possible. Generally the CEM here is a logical element. The standards may define PCRF and PCEF elements. PCRF implements PCC rule decision making and PCEF implements the execution of the PCC rule).

The changes would be taken into use when PCRF orders PCEF through Gx interface using for example RAR/RAA (Re-Authorization request/Re-Authorization Answer) or CCR/CCA messages (credit control requests/credit control answers). Other embodiments may use different messages.

Figure 3:
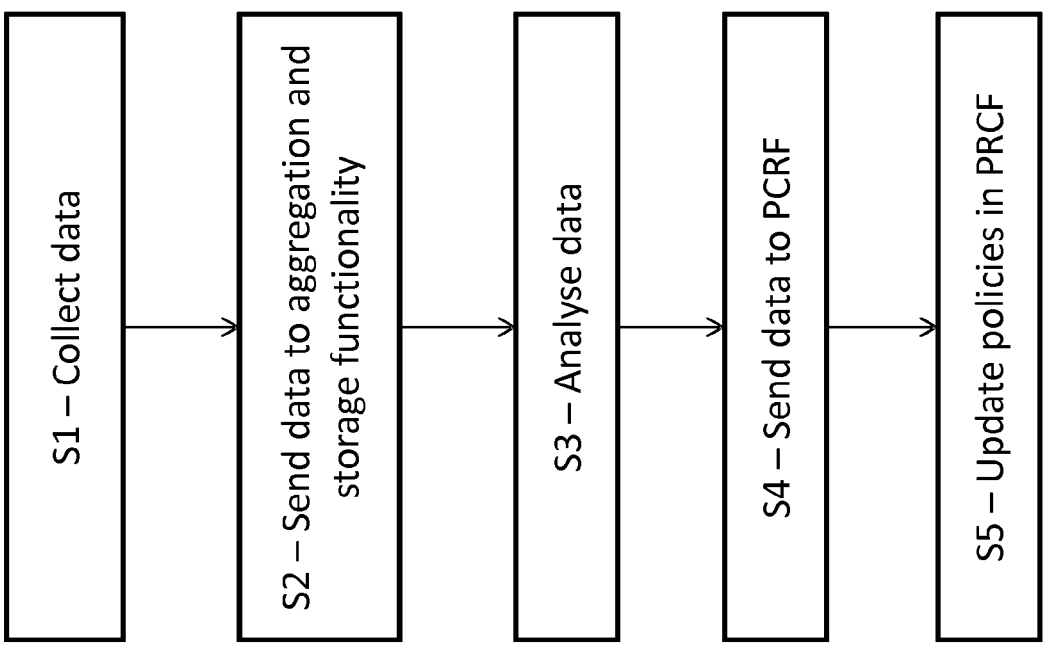
FIG. 3 shows a method flow.

Reference is made to FIG. 3, which shows a method of an embodiment.

In step S1, subscriber data may be frequently collected from one or more sources. In FIG. 2, the element doing this is the monitoring and storing functionality 44. It is a logical function and may be a vendor specific tooling. The one or more sources may comprise one or more of: one or more radio network elements, one or more core network element and any one or more of the above mentioned sources. For the network monitoring such as data collection and storage any suitable tools may be used. These may be provided by for example NMS 46 and/or the monitoring and storing functionality 44.

By way of example only, the following one or more of the following different information may be collected:
1. Subscriber identifier for example IMSI (international mobile subscriber identity), MSISDN (mobile subscriber integrated services digital network) or the like
2. Location, radio conditions, time, and/or session parameters
3. Profiles (QoS parameters)
4. Used applications, volumes, and/or active time
5. Charging characteristics
6. UE capabilities It should be appreciated that one or more different types of information may alternatively or additionally be collected.

From HLR/HSS it is possible to get one or more of the subscriber parameters.

It may be possible to obtain from the CRM and/or from the OCS/OFCS charging related subscriber parameters.

In some embodiments a traffic monitoring tool, provided in the monitoring and storing functionality 44 may collect real time data from the network (based on for example traces and/or probes).

In step S2, the data is then forwarded to an aggregation and storage functionality. This may be provided for example by a data warehouse type tool.

Aggregation may make possible the processing of data by the CEM in step S3. This processing may provide KPIs. The storage functionality may provide longer term data storage. In step S3, the CEM analyses the data and/or runs one or more algorithms. This function provides intelligence to observe for example one or more of resulting bad user experience, experienced QoS compared to requested QoS, and behaviour observed against operator policy.

For example some users were earlier experiencing a QoS problem with for example a specific application, a specific time and/or in a specific location but now the problem is fixed and the problem is not seen anymore. The CEM would be able detect this from the collected CE data). The policy could be removed/deactivated or the one or more user(s) could be removed from the list of the users to which this policy/rule is related.

In another example, CEM may detect that subscriber behaves differently than previously. For example the user is doing one or more of using one or more different applications, reduced/increased data volumes and is lately using services in different location. This would mean that a different policy rule or rule set should be applied for this subscriber.

In some embodiments, the CEM is aware of policies by accessing the PCS policy rule repository 48 and/or having this information in its own local database that is synchronized with repository 48.

The repository 48 may contain one or more of: information (meta data) about policy; policy source data (interface from which data is received and data); rule criteria; rules; subscribers for which a policy is to be used; and current status of the policy and/or rules (for example activated or deactivated).

Thus in some embodiments the CEM may query the subscriber data from data aggregation and storage functionality (for example a data warehouse tool or the like) and perform an analysis according to one or more specified algorithms.

The results of the processing may relate to one or a set (or combination) of policy rules. In some embodiments, the result may be a list of one or more entries. An entry may comprise of one or more of: policy identity or name; action (for example activate/deactivate, new policy rule, modify rule); if a new policy or policy rule is determined provide related policy rule data (this may be one or more of source data, criteria and rule including precedence); and a list of one or more subscribers to which this action is related to and in accordance with which the PCRF will update policy metadata in PCRF.

The analysis by the CEM may be to determine which policy or policies should be used, to provide one or more new policies, to change one or more policies and/or to change one or more policies which are to be used with a particular subscriber or user equipment.

In step S4, the CEM 40 provides the results of the analysis to the PCRF.

In step S5, the PCRF will use the results provided by the CEM. The PROF may modify the list of subscribers associate with a policy rule. In some embodiments, the mapping of subscriber and policy rules is managed in the PCRF and in particular in the repository 48. This may mean removing/adding a subscriber from/to this policy in policy repository.

In some embodiments, based on the data from the CEM, the PROF may alternatively or additionally select one or more (for example a set or combination) of rules to be used for specific subscriber.

One example will now be described. In an initial context set-up, a gateway (for example the PCEF) sends a CCR (Credit Control request) with information including identification such as an IMSI to the PCRF. The PCRF finds one or more policy rules related to this subscriber identity (IMSI) and returns one or more new rule in a CCA. If the subscriber in question was recently added to a specific policy, this policy and its one or more rules related to this subscriber are found.

In some embodiments, the CEM may alternatively or additionally create a new policy rule. For example, a new dynamic policy may be created by the CEM based on CEM observations and/or algorithms. This may be such that once one or policy criteria is defined, this may be stored in the PCRF. Additionally, one or more subscriber(s) to which a policy is related and/or rules are defined, this may be stored in the PCRF repository. The rule will be taken into account through policy.

In some embodiments, the CEM may alternatively or additionally modify a policy rule.

One or more service data flow filters may be used to specify the type of traffic for which a policy rule is used. By changing these filters it is possible to control which rule is utilized and when to which users.

Precedence may be used to change the rule priority. For example this may increase or decrease a priority with respect to one or more other rules. Precedence information may be used in cases when there is more than one rule with overlapping data flow filters. With precedence information one or more rules can prioritized over others.

The rule itself may be modified. This may mean that the action taken when a certain one or more condition occurs may be changed. In some embodiments, alternatively or additionally, the conditions associated with one or more rules may be changed. For example, this may mean in practice changing the parameters to be used in the session, for example QoS or the like.

In some embodiments, the CEM may activate/deactivate one or more policy rule. The status of a rule may be changed: to use it or not to use it.

Once the CEM observes a need for doing any one or more of the actions mentioned previously, the CEM updates the PCRF, for example the PCRF repository. The CEM may do one or more of add/remove a policy, change a list of subscribers associated with the policy and modify an existing policy (for example to change one or more of precedence, service data filters or rules).

The rules and/or modifications of the rules are transferred in step S6 to the PCEF. In some embodiments, this may be through standardized mechanisms in the Gx specification using CCR/CCA for sessions to be established or RAR/RAA (Re-Authorization request/Re-Authorization Answer) for updated rules for on-going sessions.

As mentioned earlier predefined rules (rules that are pre-set in the PCEF) can be only activated or deactivated. Thus for these rules, the CEM may able to control, based on subscriber data whether to use one or more predefined rules for a user or not. The control of the predefined rules may be based on customer experience data. A decision by the CEM may change a status of a rule in the PCRF and PCRF repository. This change may be communicated to the PCEF by referencing the rule in CCR/CCA and/or RAR/RAA messages.

In case of dynamic rules one or more of the above scenarios may be applied. The CEM may change the status of one or more of the policy and/or rule, the list of subscribers for which the policy is valid, the content of the policy rule (for example one or more of service data flow filter, precedence or the rule itself) and create/delete the policy and rules in PCRF, for example the PCRF repository.

Again the PCRF may communicate changes to the PCEF through CCR/CCA and RAR/RAA messages.

In some embodiments, one or more of the algorithms of the CEM may have additional intelligence to understand if a change improved (or not) the problem and/or improved (or not) the customer experience. In some embodiments, this is done by creating a knowledge base for CEM based policy changes. In some embodiments, this may be implemented by the CEM storing the observed subscriber information (for example a customer experience) before a change and the corresponding information after the changed. The information may be stored for one or more KPIs. Once a CEM next executes one or more algorithms, the CEM may compare new measurements and/or related KPIs to the information in the storage. The result as to whether CE or similar measure is better or worse after the change may be determined and for example stored in the knowledge base. The results in the knowledge base may be one source for the decision procedure described above. In some embodiments, learning can be reinforcement learning as described above and/or the learning can be based on supervised learning in which success of policy actions is learned based on actions taken by a human operator (for example selection of policy rules based on current measurements). Thus the system would record taken actions and related results under different conditions as discussed previously and based on that learn what would be the best action to take next time when similar conditions occur.

In some embodiments a CEM 40 or similar functionality may collect customer specific data from one or more radio and/or core network elements. The data may be collected periodically or on-demand. The CEM may calculate and/or analyse KPIs against for example a customer's subscription and/or operator policies. Based on this, the CEM may order the PCS (for example the PCRF) to one or more of enable/disable policies, change policy parameters and impact on the list of subscribers to which the policy is applied.

In addition to customer specific data, one or more network performance metrics (for example load and traffic policies) can be used for controlling customer specific policies.

Figure 4:
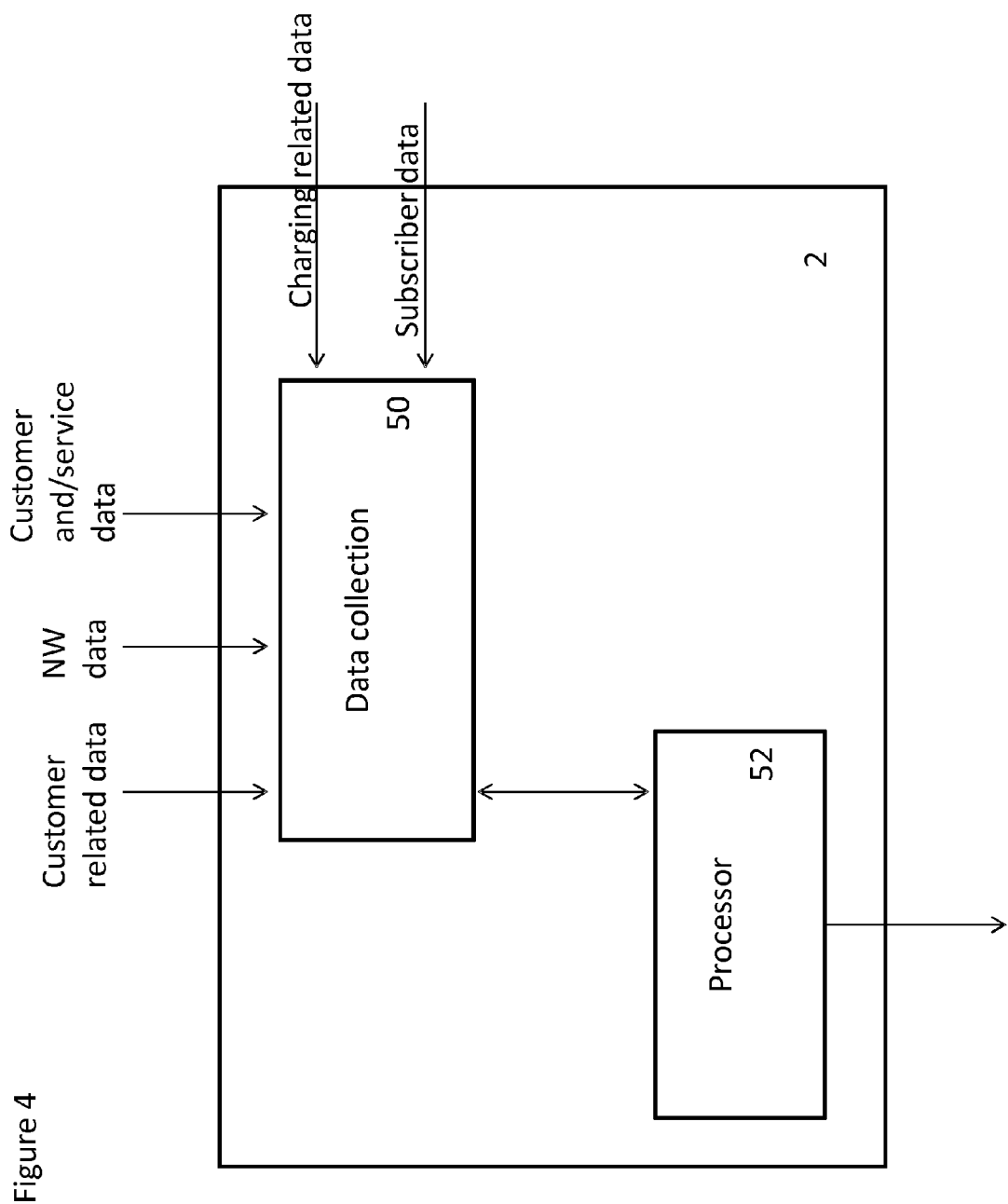
FIG. 4 shows a schematic diagram of a customer experience module apparatus.

Reference is now made to FIG. 4 which schematically shows an apparatus providing a CEM function. The apparatus comprises a data collection part 50. The data collection part 50 may comprise one or more at least one database, at least one memory and/or any other suitable data store. The data collection function 50 is configured to collect the customer related data, network data, customer and service data, subscriber data and charging related data as previously described. It should be appreciated that in alternative embodiments, only one or some of the above-mentioned data may be collected. Alternatively or additionally, any other suitable data may be collected.

At least one processor 52 is configured to analyse the collected data to determine if a policy with respect to one or more user equipment needs to be changed. As mentioned previously, that modification may comprise modifying an existing policy, changing the policy which applies to a particular user equipment or to define a new policy.

To facilitate the learning of some embodiments, the determination made by the at least one processor 52 in response to a particular set of data may be stored in the data collection function. In some embodiments, a separate data store may be provided for this information. The data collection unit will also provide data to the processor 52 which allows the processor 52 to analyse whether a change in policy management has improved the situation. This may be done by comparing the previous data with the data following the change in policy management.

In some embodiments, subscriber specific data may be collected relating to one or more subscribers/user equipment. This data may be collected for subscribers/user equipment using one or more services and/or having a session in the network. In some embodiments, data is collected for one or more active user equipment in the network. An active user equipment may be a user equipment for example not in an idle mode, for example using a service or having a session.

Alternative embodiments may be used with any suitable standard in addition to or as an alternative to those of the embodiments described previously.

In some embodiments, the function of the CEM may provide policy management where session parameters in relation to one or more policies may be adjusted.

An appropriately adapted computer program code product or products may be used for implementing some embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method for policy management performed by a customer experience management module in a network comprising:
    collecting data relating to one or more active user equipment in the network;
    collecting one or more network performance metrics, and one or more network conditions;
    processing said data, said one or more network performance metrics, and said one or more network conditions; and
    responsive to said processing, determining if policy management provided by a policy function of the network with respect to a respective user equipment is to be changed,
    wherein the data includes service data of at least one or more of how many users use a service, how much data was carried when using the service, and which radio access technologies were used by the service, wherein said data comprises customer experience data, wherein said customer experience data comprises experienced parameter compared to a requested parameter, a failure of service parameter, a handover failure parameter, latency, number of handovers, quality of service parameter, and data rate, wherein the method further comprises comparing data prior to a change in policy management and after said change in policy management to determine an effectiveness of said change, including whether said change improves said customer experience, wherein the method further comprises using said effectiveness of said change to determine if said changed policy management is to be used when one or more similar conditions are present, and wherein, based on said data which the customer experience management module has collected and said determination, said customer experience management module orders a policy and charging rules function to enable or disable policies.

2. The method as claimed in claim 1, wherein if said policy management is to be changed, causing one or more policies to be one of activated or deactivated.

3. The method as claimed in claim 1, wherein if said policy management is to be changed, causing one or more parameters of one or more policies to be changed.

4. The method as claimed in claim 1, wherein if said policy management is to be changed, causing one or more policies which are associated with said respective user equipment to be changed.

5. The method as claimed in claim 1, wherein if said policy management is to be changed, causing one or more new policies to be stored in said policy function.

6. The method as claimed in claim 1, wherein said processing comprises analysing said data.

7. The method as claimed in claim 1, wherein said processing comprises determining at least one key performance indicator.

8. The method as claimed in claim 1, wherein said processing comprises determining a current performance with respect to an expected performance.

9. The method as claimed in claim 1, wherein said policy function comprises a policy and charging enforcement function.

10. The method as claimed in claim 1, wherein said data comprises at least one of historical data and real time data.

11. A computer program embodied on a non-transitory computer-readable medium, said program comprising computer executable code which when run causes the method of claim 1 to be performed.

12. An apparatus, for policy management in a network, comprising at least one processor and at least one memory including computer code for one or more programs, the at least one memory and the computer code configured, with the at least one processor, to cause the apparatus at least to:

collect data relating to one or more active user equipment in the network;

collect one or more network performance metrics, and one or more network conditions;

process said data, said one or more network performance metrics, and said one or more network conditions; and responsive to said processing, determine if policy management provided by a policy function of the network with respect to a respective user equipment is to be changed, wherein the data includes service data of at least one or more of how many users use a service, how much data was carried when using the service, and which radio access technologies were used by the service, wherein said data comprises customer experience data, wherein said customer experience data comprises experienced parameter compared to a requested parameter, a failure of service parameter, a handover failure parameter, latency, number of handovers, quality of service parameter, and data rate, wherein the at least one memory and the computer code are further configured, with the at least one processor, to cause the apparatus at least to compare data prior to a change in policy management and after said change in policy management to determine an effectiveness of said change, including whether said change improves said customer experience, wherein the at least one memory and the computer code are further configured, with the at least one processor, to cause the apparatus at least to use said effectiveness of said change to determine if said changed policy management is to be used when one or more similar conditions are present, and wherein, based on said data which the apparatus has collected and said determination, said apparatus orders a policy and charging rules function to enable or disable policies.

13. The apparatus as claimed in claim 12, wherein the at least one memory and the computer program code are configured to, with the at least one processor, cause the apparatus to cause one or more policies to be one of activated or deactivated.

14. The apparatus as claimed in claim 12, wherein the at least one memory and the computer program code are configured to, with the at least one processor, cause the apparatus to cause one or more parameters of one or more policies to be changed.

15. The apparatus as claimed in claim 12, wherein the at least one memory and the computer program code are configured to, with the at least one processor, cause the apparatus to cause one or more policies which are associated with said user equipment to be changed.

16. The apparatus as claimed in claim 12, wherein the data comprises customer experience data.

* * * * *